I. LANGMUIR.
VACUUM GAGE.
APPLICATION FILED MAR. 8, 1913.

1,126,233.

Patented Jan. 26, 1915.

Witnesses:
Irving E. Steers
J. Ellis Glenn

Inventor
Irving Langmuir,
by Albert G. Davis
His Attorney.

UNITED STATES PATENT OFFICE.

IRVING LANGMUIR, OF SCHENECTADY, NEW YORK, ASSIGNOR TO GENERAL ELECTRIC COMPANY, A CORPORATION OF NEW YORK.

VACUUM-GAGE.

1,126,233.  Specification of Letters Patent.  Patented Jan. 26, 1915.

Application filed March 8, 1913. Serial No. 752,954.

*To all whom it may concern:*

Be it known that I, IRVING LANGMUIR, a citizen of the United States, residing at Schenectady, in the county of Schenectady and State of New York, have invented certain new and useful Improvements in Vacuum-Gages, of which the following is a specification.

The present invention relates to the measurement of high vacua.

The term "vacuum" as commonly used denotes a rarefied atmosphere which has an appreciable and measurable pressure. As the apparatus for exhausting gases has become improved the degree of rarefaction has steadily approached the theoretically perfect vacuum making the measurements of the minute residual gas pressures increasingly difficult. The well-known McLeod gage will measure a pressure of about 0.01 of a micron, in other words, a pressure 0.00001 of a millimeter of mercury. It does not take account of vapors, such as the vapor of mercury, water, or oil. Recent improvements in evacuating apparatus have made possible the attainment of still lower pressures. In accordance with my invention these very low pressures are measured by observing the drag, or torque exerted upon a suspended body by the impact of the residual gas molecules when set into motion at a predetermined rate. This method is carried out in appartus in which a disk, or other body of extended surface, is rotated at a given speed in proximity to another body in the evacuated space.

Figure 1:
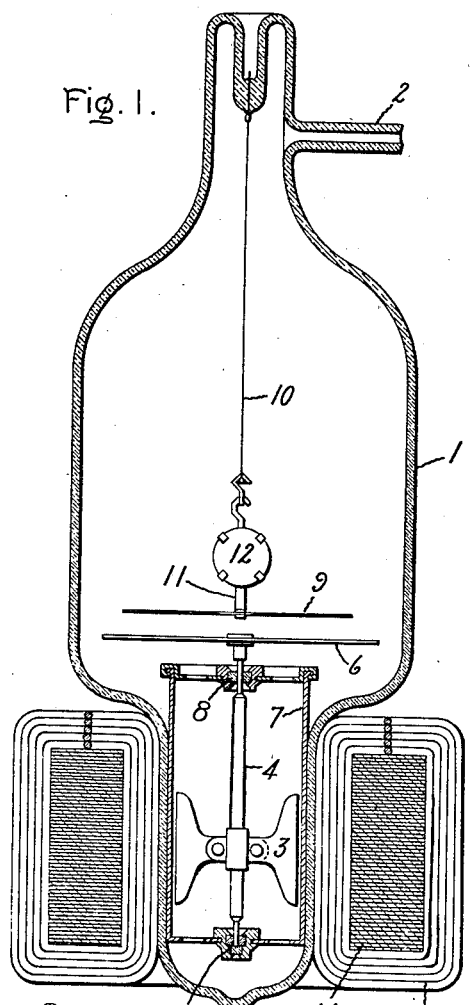
Figure 2:
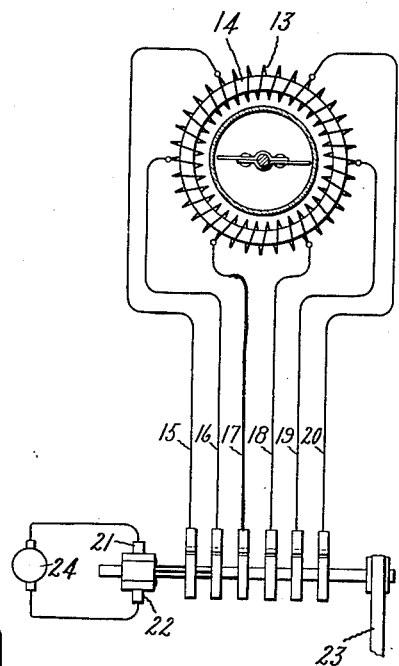
Figure 3:
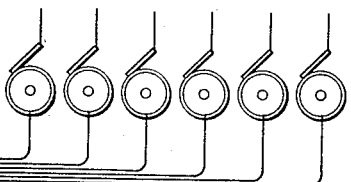
Figure 4:
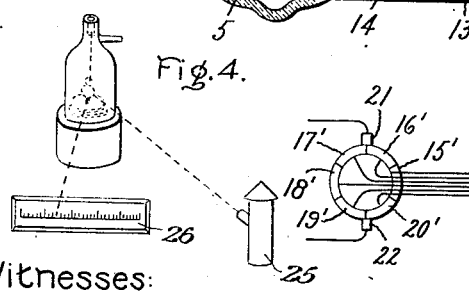

In the accompanying drawings, Figure 1 is a vertical section of the vacuum meter or gage, Figs. 2 and 3 are diagrams of a preferred form of electrical driving device, and Fig. 4 illustrates diagrammatically an indicating device.

In Fig. 1 the receptacle 1 consists in part at least of transparent material, as glass, quartz or the like, connected to the chamber, or system, in which the vacuum is to be measured through a tube 2. In this receptacle is mounted a motor armature 3 which may consist of a body of magnetic material having opposite poles as indicated which revolves in synchronism with an exterior field. It is mounted on a shaft 4 which is pivoted upon a jewel bearing 5. A light disk 6 consisting preferably of aluminum, is also mounted upon the shaft 4. The shaft is accurately centered and supported by a frame work 7, the shaft preferably passing through a jewel 8. A second disk 9, preferably of nonconducting material, as mica, is supported in close proximity to the motor disk 6 by means of a quartz fiber 10, or other suitable torsional support. Upon the stem 11 attached to the disk is mounted a mirror 12. The motor element of the gage is rotated by a revolving magnetic field produced by the winding 13 which may be provided with a magnetic core 14, although the latter is not absolutely necessary. The winding 13 is in effect the field coil of a synchronous motor, and may be constructed accordingly. The winding 13 is divided into sections which may be supplied with polyphase alternating current. However, as shown in Figs. 2 and 3, they are preferably supplied with opposite pulsations of current derived from a direct current source such as the generator 24. The conductors 15, 16, 17, 18, 19 and 20 are connected to slip rings, which are connected respectively to sections 15, 16', 17', 18', 19' and 20' of a commutator upon which bear brushes 21 and 22. When the commutator is rotated, as by belt 23, the connection from direct-current source 24 is progressively transferred from wires 16 and 19, to 17 and 20, to 18 and 15, and so on. In this way the field shifts thus rotating in synchronism the member 3. In this manner the motor element may be driven at any predetermined constant speed, and by varying the speed of the rotating member the sensitiveness of the gage may be controlled. Greater sensitiveness may be secured by higher speeds.

The rotation of the disk 6 imparts a torque to the disk 9 proportional to the pressure of the residual gas and the square root of the molecular weight. This torque is due to the frictional engagement of the disk 6 with the gas molecules in the chamber 1 causing a movement of the gas molecules which exerts a drag upon the disk 9 twisting it in proportion to the gaseous pressure for any given gas. A torsional support, such as a quartz fiber, exerts a twisting moment or restoring torque proportional to the angle through which the fiber is twisted. As the rotating disk may be revolved at a very high speed very low pressures may be measured in this manner with great accuracy and the presence of vapors of mercury or other liquids will have the same effect as the presence of fixed gases. The displacement is registered in any known way, for example, by noting the deflection of a beam of light from a source 25 reflected from mirror 12 upon a scale 26. Pressures as low as 0.0001 microns (0.0000001 m. m. of mercury) may be easily measured.

My device may be used for measuring pressures below about 0.5 m. m. of mercury, and it is particularly useful for measuring the very low pressure attainable by such devices as the molecular pump.

What I claim as new and desire to secure by Letters Patent of the United States, is:

1. The method of measuring the pressure of the residual gas in an evacuated space which consists in setting the residual gas in motion at a predetermined rate, and determining a force exerted by such gas by virtue of its motion.

2. A vacuum gage comprising an evacuated gas-tight envelop a rotatable member mounted therein, means for rotating said member at a constant speed, a movable body in proximity to but out of contact with said rotating member, and means for indicating the displacement of said movable body effected by the rotation of said member.

3. A vacuum gage comprising a gas-tight chamber, a motor disk mounted therein, means for rotating said disk at a predetermined rate, a disk suspended in proximity to but out of contact with said motor disk, and means for indicating the torque exerted on said suspended disk.

4. A vacuum gage comprising a gas-tight chamber, a rotatable member of extended surface mounted therein, means for rotating said member, and a torsionally suspended indicating member also of extended surface in proximity to but out of contact with said rotatable member, and means for indicating the torque of said suspended member.

5. A vacuum gage comprising an envelop a rotatable disk mounted therein, a motor for rotating the disk at a predetermined speed, a mica disk located immediately above but out of contact with said rotatable disk, a quartz fiber torsionally suspending said mica disk, and means for indicating the torque exerted by the rotating disk upon the suspended disk through the residual vapor in the evacuated space.

6. The method of measuring the pressure of a highly attenuated gas which consists in mechanically transmitting a torque to a body through the medium of the residual gas and determining said torque by the displacement imparted thereby to said body.

7. A gage for measuring the pressure of a highly attenuated gas comprising an envelop, a rotatable member therein for extended surface a movable indicating member also of extended surface mounted in close proximity to but out of contact with said rotatable member, means for transmitting torque to said indicating member through the frictional engagement of attenuated gas whose pressure is to be measured, means for opposing the displacement of the indicating member by a restoring torque, and means for indicating the amount of displacement of the indicating member.

In witness whereof, I have hereunto set my hand this sixth day of March, 1913.

IRVING LANGMUIR.

Witnesses:
BENJAMIN B. HULL,
HELEN ORFORD.

It is hereby certified that in Letters Patent No. 1,126,233, granted January 26, 1915, upon the application of Irving Langmuir, of Schenectady, New York, for an improvement in "Vacuum-Gages," errors appear in the printed specification requiring correction as follows: Page 1, line 80, for the reference-numeral "15" read *15'*; page 2, line 12, for the word "pressure," read *pressures;* same page, line 63, for the word "for" read *of;* and that the said Letters Patent should be read with these corrections therein that the same may conform to the record of the case in the Patent Office.

Signed and sealed this 9th day of February, A. D., 1915.

[SEAL.]

J. T. NEWTON,
*Acting Commissioner of Patents.*